United States Patent [19]
Adler et al.

[11] Patent Number: 5,381,090
[45] Date of Patent: Jan. 10, 1995

[54] HUB AND BEARING ASSEMBLY WITH INTEGRATED ROTATION SENSOR AND TEMPERATURE MEASUREMENT FEATURE

[75] Inventors: Jonathan M. Adler; Kevin J. Fontenot, both of Ypsilanti, Mich.

[73] Assignee: NTN Technical Center, Ann Arbor, Mich.

[21] Appl. No.: 190,243

[22] Filed: Jan. 31, 1994

Related U.S. Application Data

[60] Continuation of Ser. No. 946,944, Sep. 16, 1992, abandoned, which is a division of Ser. No. 800,056, Nov. 11, 1991, Pat. No. 5,200,697.

[51] Int. Cl.[6] .................. G01P 3/487; G01P 3/488; F16C 32/00; G01K 7/00
[52] U.S. Cl. .................. 324/174; 324/207.12; 310/68 C; 374/183; 384/448
[58] Field of Search ........... 324/166, 173, 174, 207.12, 324/207.15, 207.25, 225; 310/68 B, 68 C, 156, 168; 188/181 R; 384/448; 374/183, 184

[56] References Cited

U.S. PATENT DOCUMENTS

| | | | |
|---|---|---|---|
| 3,676,765 | 7/1972 | Westcott | 324/174 X |
| 4,316,144 | 2/1982 | Levijoki | 324/174 |
| 4,797,614 | 1/1989 | Nelson | 324/224 X |
| 4,893,079 | 1/1990 | Kustra et al. | 324/225 |
| 5,015,948 | 5/1991 | Tew | 324/227 X |
| 5,043,661 | 8/1991 | Dubey | 324/225 X |
| 5,111,098 | 5/1992 | Peck et al. | 324/174 X |
| 5,115,193 | 5/1992 | Bean et al. | 324/207.12 |
| 5,223,760 | 6/1993 | Peck et al. | 324/174 X |

Primary Examiner—Gerard R. Strecker
Attorney, Agent, or Firm—Harness, Dickey & Pierce

[57] ABSTRACT

A bearing assembly incorporating a speed and/or temperature sensor particularly adapted for motor vehicle wheel applications. The sensor incorporates a magnetized tone ring defining a radial or cylindrical face which interacts with an annular transducer. The transducer has a plurality of teeth facing the magnetized tone ring with separate first and second rows of teeth extending from the transducer frame. The first set of teeth engage one area of the tone ring defining one magnetic pole whereas the second series of teeth interact with regions of the tone ring defining the opposite magnetic pole. Relative rotation between the transducer and tone ring induces an alternating magnetic field through the transducer case which induces an alternating voltage in the winding coil. The transducer is efficiently packaged within the enclosed cavity of a bearing assembly. This invention further contemplates a means to allow transducer temperature to be evaluated by monitoring the DC resistance of the transducer winding.

10 Claims, 7 Drawing Sheets

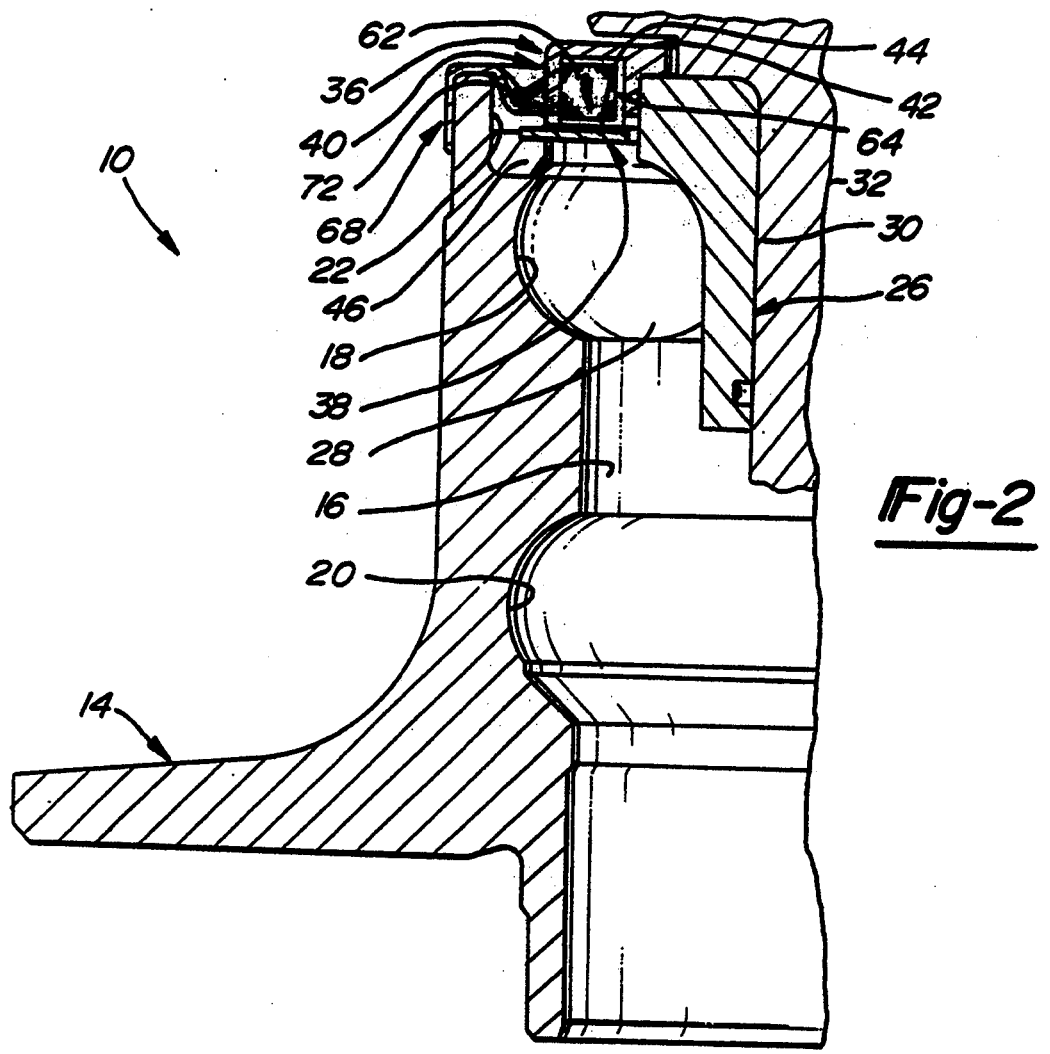
*Fig-2*
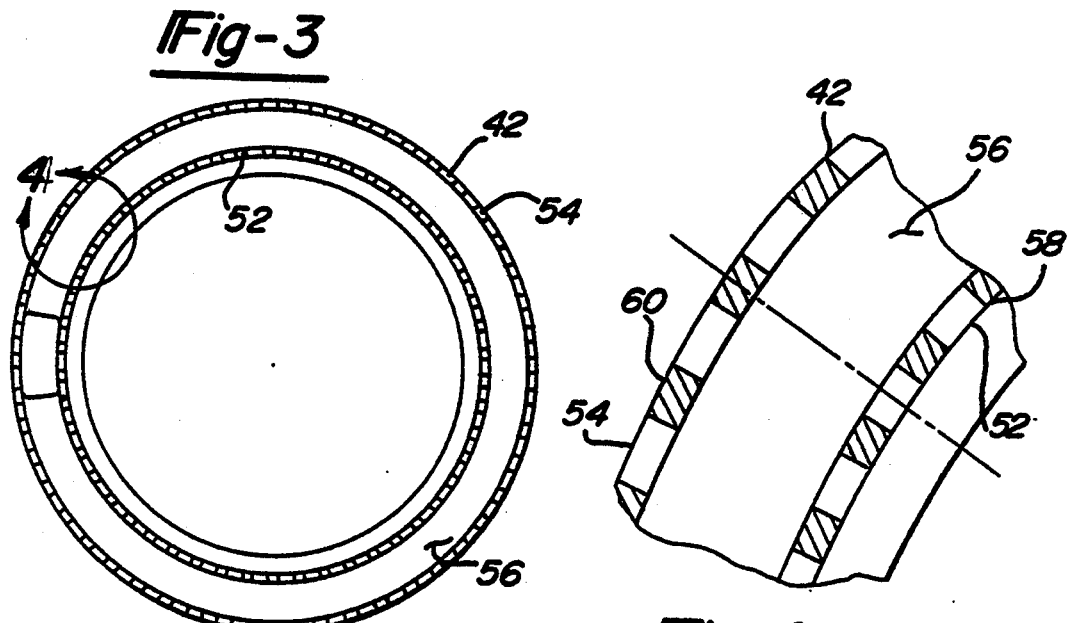
*Fig-3*
*Fig-4*

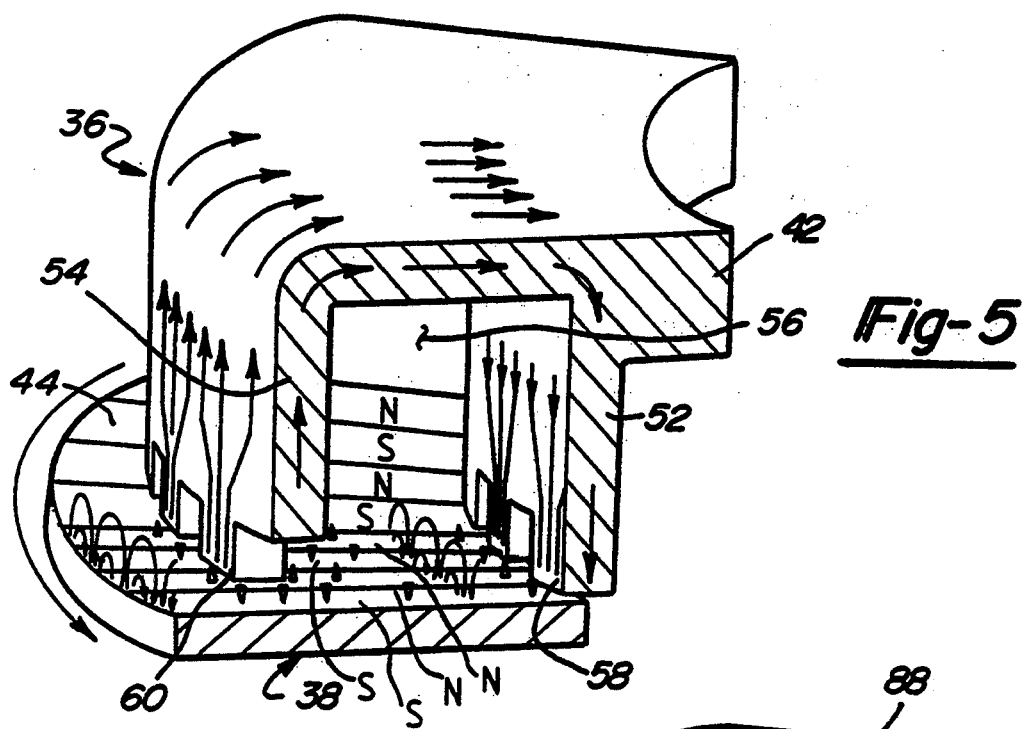
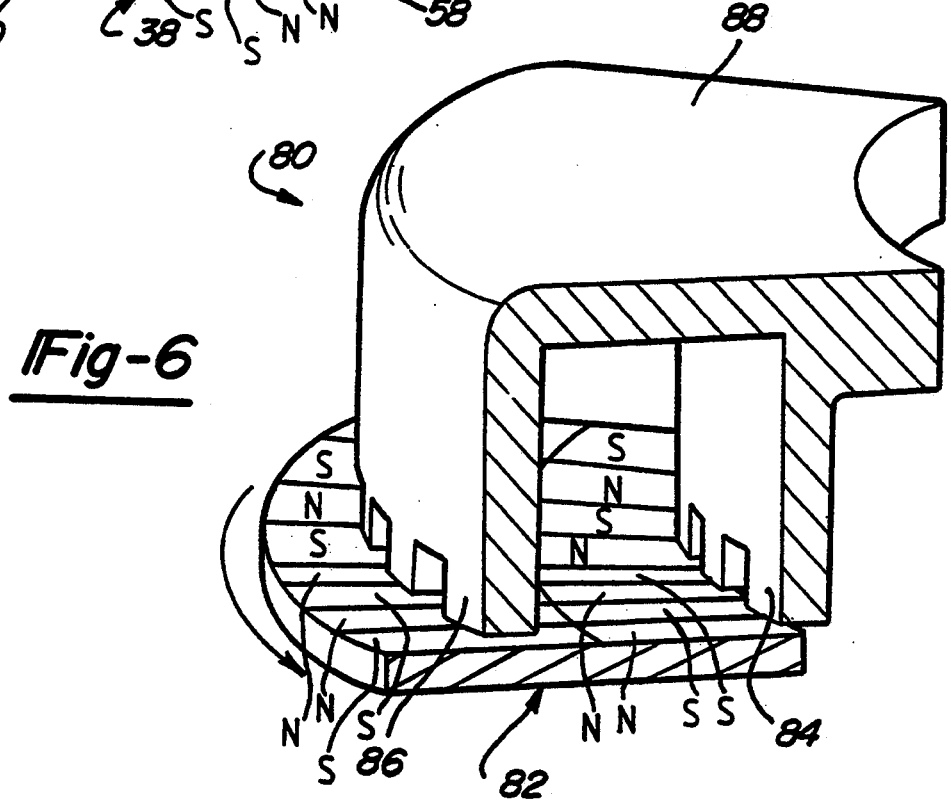

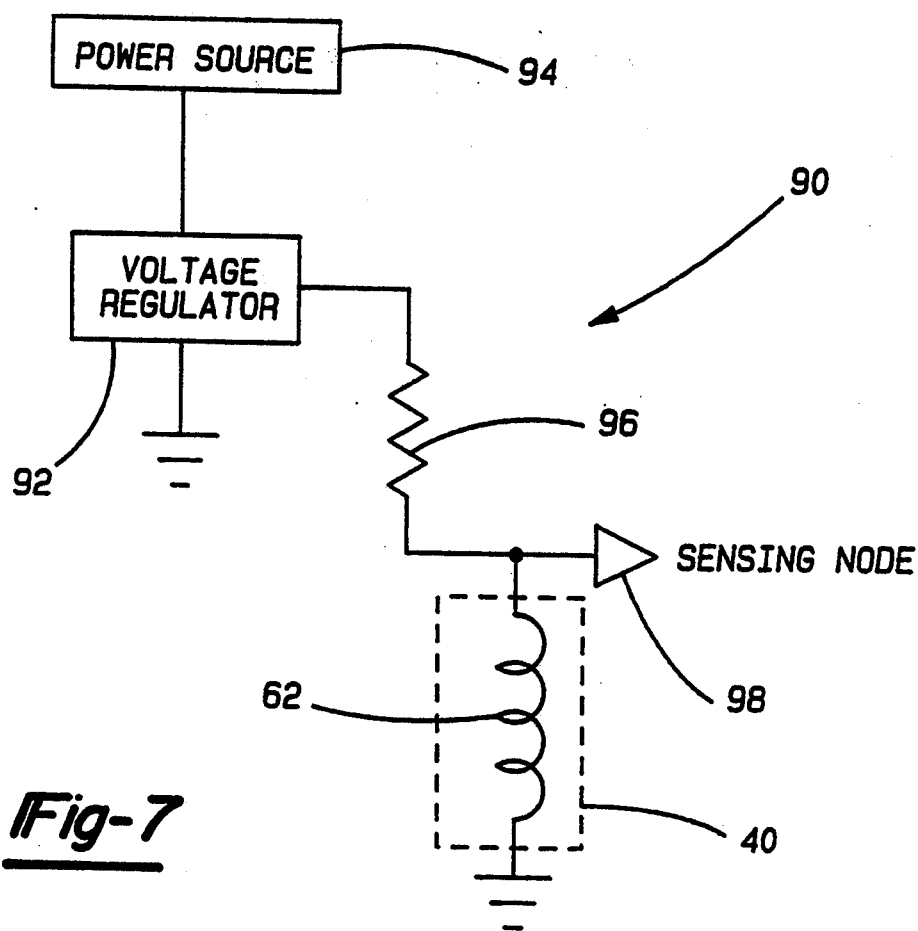
_Fig-7_
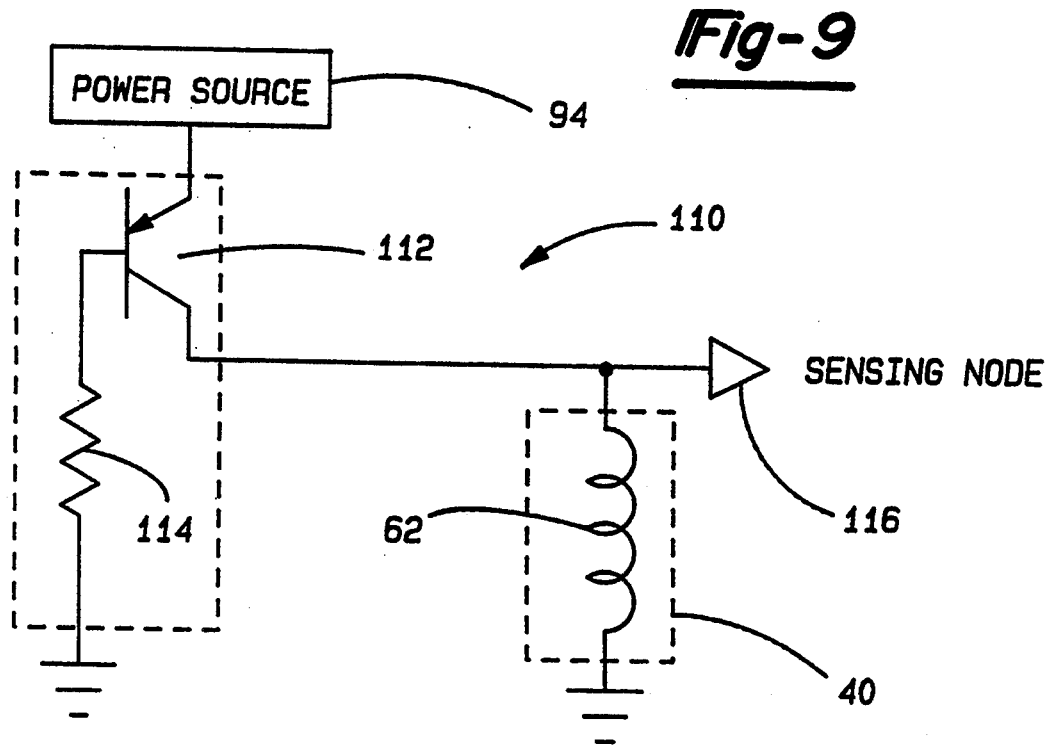
_Fig-9_

HUB AND BEARING ASSEMBLY WITH INTEGRATED ROTATION SENSOR AND TEMPERATURE MEASUREMENT FEATURE

This is a continuation of U.S. patent application Ser. No. 07/946,944, filed Sep. 16, 1992, now abandoned, which is a division of U.S. Pat. No. 5,200,697, issued Apr. 16, 1993.

BACKGROUND AND SUMMARY OF INVENTION

This invention relates to a rotational speed sensor and particularly to one for use on a motor vehicle for detecting the rotational speed of a ground engaging wheel. The invention further relates to such sensors having temperature sensing capabilities.

In numerous environments, there is a need to measure relative rotation between elements of a machine. For example, rotation sensors are used for Jet engine main shafts, machine tool spindles, etc. Another application for such sensors is for anti-lock braking systems (ABS) which are increasingly popular on present day motor vehicles. Such systems are provided to automatically prevent wheel lock-up during hard braking maneuvers so that vehicle stability and directional control can be maintained. A critical feature of an ABS is a wheel speed sensor which provides an output to an ABS controller related to wheel rotation. Many passenger cars have such a sensor for each of their four Wheels. Through such inputs, the braking system controller can determine if a wheel lock-up condition has occurred or is being approached and thus control the braking system. Wheel speed sensors are also used to provide inputs for traction control systems which reduce wheel spin during acceleration.

Numerous designs of ABS wheel speed sensors are presently known. Such sensors generally consist of a rotating part (rotor) in close proximity to a stationary part (stator). The rotating part, or "tone ring", has features which can be sensed as they pass the stationary part. Such features are typically ferromagnetic teeth, as on a gear, or magnetic poles which have been applied to the part. The stationary part includes a transducer which can detect the passing of the features of the tone ring as the tone ring rotates. The detection is indicated by an electrical signal which is emitted by the transducer. The transducer may be a variable reluctance device, Hall effect device, magneto-restrictive device, or of some other construction. Generally, the transducer is a device which senses magnetic fields or changing magnetic fields. Variable reluctance transducers are referred to as "passive" sensors in that they generate a voltage without being energized by an external source. "Active" sensors such as a Hall effect device are energized by an externally applied voltage and provide an output responsive to the magnetic fields passing through them.

Although sensors utilizing the above described technologies have been implemented with success, designers of such systems are constantly striving to increase their reliability, increase output signal strength, reduce packaging space requirements, facilitate production, assembly and calibration, all the while seeking to reduce their cost. Of principal concern is protecting the sensor elements from contaminants and environmental exposure. Road debris such as dirt, dust, salt and water can interfere with an unprotected sensor. In addition, wear debris from braking surfaces and significant temperature extremes are encountered by the sensor system. A present trend in wheel speed sensor design is to integrate the sensor into a wheel bearing assembly, enabling the system to be aligned and tested prior to being shipped to the vehicle manufacturer. Moreover, such an integrated configuration simplifies vehicle assembly on the assembly line and should increase reliability.

In modern day motor vehicle design, efficiency of packaging, light weight, ease of assembly, and reliability are of paramount importance. The hub and bearing assembly of this invention provides a compact and efficient construction and integrates many of the components of the bearing into the wheel speed sensor to provide an efficiently packaged unit. Moreover, the construction of the hub and bearing of this invention provides a sealed environment for the speed sensor, isolating it from environmental factors. The efficient magnetic configuration of the assembly of this invention provides a high level electrical output even at relatively low wheel speeds as compared with other variable reluctance type transducers.

Temperatures within vehicle wheel hubs can reach extreme levels as a result of bearing failures caused by lack of lubricant or other causes of high friction. Excessive temperatures can also be generated by the braking system caused, for example, by heavy use of the vehicle brakes in panic braking situations, or constant application of braking pressure on long down grades, especially in heavy-duty vehicles. If an indication of excessive wheel hub temperature is available, a driver could take corrective action. Although temperature sensing systems are presently known, they generally require the use of a separate sensing element such as a thermocouple or thermistor.

Another facet of the present invention is to utilize the coil winding of a wheel speed sensor transducer as a temperature sensitive element. The electrical resistance of the coil varies as a function of its temperature. By monitoring the coil resistance, the temperature may be determined. Several electrical circuit configurations are described to enable such resistance measurements.

In addition to motor vehicle applications, the features of this invention are believed applicable to a broad range of applications where a measurement of relative rotation is desired and/or where temperature measurements are needed.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a partial cross-sectional view of the hub and bearing assembly of FIG. 1, shown in an assembled condition.

FIG. 3 is a frontal view of the annular transducer case shown in FIG. 2 according to a first embodiment of this invention, particularly showing the staggered teeth arrangement formed by the transducer case.

FIG. 4 is an enlarged partial view taken from FIG. 3.

FIG. 5 is a partial pictorial view of the annular sensor shown in the prior Figures particularly showing the staggered inner and outer teeth, FIG. 6 is a partial pictorial view of a sensor in accordance with a second embodiment of this invention featuring a transducer frame having radially aligned inner and outer teeth.

FIG. 7 is a simplified electrical circuit diagram showing a voltage divider circuit for obtaining an output voltage related to coil winding temperature.

FIG. 9 is a simplified electrical circuit diagram providing a constant current source approach for determining the resistance of a coil winding as affected by winding temperature.

DETAILED DESCRIPTION OF THE INVENTION

Figure 1:
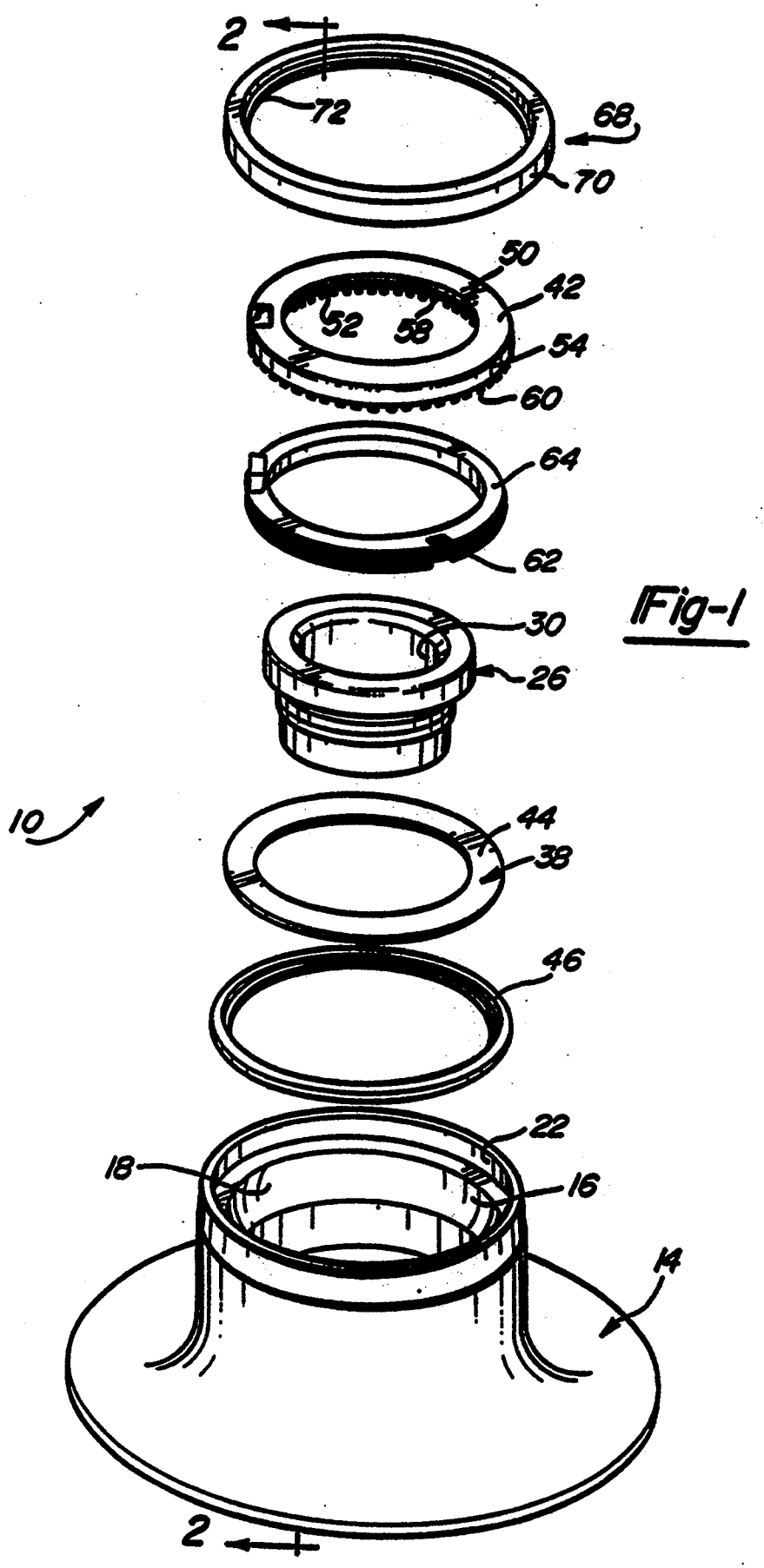
FIG. 1 is an exploded pictorial view of a hub and bearing assembly in accordance with this invention.

A hub and bearing assembly in accordance with this invention is shown in FIGS. 1 and 2 and is generally designated there by reference number 10. Hub and bearing assembly 10 as shown in the Figures is particularly adapted for use on a non-driven axle of a motor vehicle. The concepts of the present invention are, however, applicable to hub and bearing assemblies for driven axles.

Hub 14 has a radially extending flange which provides a mounting surface for a vehicle wheel (not shown). Hub 14 also defines an inside cylindrical surface 16 and a pair of roller bearing elements races including inboard race 18 and an outboard race 20. Hub 14 also has a stepped enlarged bore section 22 which, as will be explained in detail below, provides an area for mounting of a wheel rotation sensor.

Bearing inner race 26 is positioned inside hub 14 and engages a series of ball bearing elements 28 and defines the inboard bearing of the assembly. The outboard inner race is not shown in the Figures and would be of conventional construction, defining an inner surface for engagement with an outboard series of ball elements. Inner race 26 also has an inside cylindrical passageway 30 which is provided for mounting to a non-rotating spindle 32 of the vehicle. In operation, a vehicle wheel mounted to hub 14 rotates, while inner race 26 is fixed relative to spindle 32. A principle feature of hub and bearing assembly 10 in accordance with this invention is the provision of sensor 36 for the detection of wheel rotation. As previously explained, sensor 36 provides an output for control of an ABS or traction control system for a vehicle. Sensor 36 generally comprises a rotor and stator in the form of tone ring 38 and annular transducer 40, respectively. In addition to FIGS. 1 and 2, reference will be made to FIGS. 3 through 5 in a description of sensor 36.

Tone ring 38 is a permanent magnet in a disk configuration and has a radial face surface 44. As best shown in FIG. 2, tone ring 38 is carried by tone ring retainer 46 which is press fit into hub bore 22. In an alternate design, tone ring 38 could be directly fit into hub bore 22. FIG. 5 shows that tone ring 38 defines areas of magnetic polarity arranged along radials with respect to the center of rotation of the hub bearing assembly. The polarity of tone ring 38 alternates along face surface 44 in a circumferential direction. The magnetic fields produced by the poles are oriented through radial face 44 of the tone ring. While various materials for forming tone ring can be implemented, these inventors have found that an alloy of Fe—Cr—Co can be used.

Annular transducer 40 has a case 42 in the shape of a side-opening shell, having a radial side wall 50 and a pair of cylindrical walls including inner wall 52 and outer wall 54. Walls 52 and 54 are separated to define an annular cavity 56. Both walls 52 and 54 define a plurality of extending teeth 58 and 60, respectively, arranged around their perimeter. As shown in FIG. 1, transducer cavity 56 accommodates a coil winding 62 which is wrapped within bobbin 64. Preferably, the number of teeth of each of walls 52 and 54 are equal to the number of regions of tone ring 38 which are magnetized with a particular magnetic polarity.

As shown in FIGS. 4 and 5, teeth 58 and 60 are radially staggered such that the outer set of teeth 60 are facing areas of tone ring 38 defining one magnetic pole, whereas inner teeth 52 are facing an area of tone ring 38 defining the opposite magnetic pole. As shown in FIG. 4, a radial line is shown passing between inner teeth 58 while intersecting with outer tooth 60. In the orientation shown in FIG. 5, as outer teeth 60 are facing North magnetic poles, inner teeth 58 are facing South magnetic pole regions. As tone ring 38 rotates as shown by the curved arrow, transducer teeth 58 and 60 face alternating magnetic poles. This induces a reversing magnetic field through transducer case 42. In FIG. 5, the arrows along the surface of transducer case 42 and tone ring 38 show the lines of magnetic flux for the illustrated relative orientation between transducer case 42 and tone ring 38. However, upon relative rotation of tone ring 38, the flux field reverses in direction. This reversing magnetic flux field through annular transducer case 42 induces an emf (voltage) within coil winding 62.

The configuration of annular transducer 40 provides excellent electrical output since each of the inner and outer sets of teeth 58 and 60 magnetically engage with all of the magnetized regions of tone ring 58 upon relative rotation. Therefore, most of the magnetic flux from the entire tone ring 58 participates in developing an emf within coil winding 62.

Annular transducer 40 is fixed relative to inner race 26, preferably through press-fitting it onto an external cylindrical surface of inner race 26 as shown in FIG. 2. The bearing rolling ball elements 28 and sensor 36 are protected by seal 68. Seal 68 has a retainer ring 70 which is press-fit onto hub 14 and mounts an elastic lip 72 which contacts transducer case 42. Since transducer 40 is oriented such that the open portion of case 42 is facing ball elements 28, the radial side surface 50, and walls 52 and 54, combine to enclose and protect the bearing elements. This configuration also has the advantage that sensor 36 is readily accessible for service or replacement.

FIG. 6 illustrates an alternate embodiment of a sensor in accordance with this invention which is designated by reference number 80. Tone ring 82 shown in FIG. 6 defines areas of magnetic polarity which alternate not only in a circumferential direction along its radial face as in the case of tone ring 38, but also alternate in a radial direction. With this configuration, the inner and outer transducer case teeth 84 and 86, respectively, of case 88 are oriented along radials with respect to the axis of rotation of the hub and bearing assembly. With this orientation, the same magnetic conditions exists as in the first embodiment in that the outer set of teeth 86 are exposed to magnetic poles of one polarity at the same time that the inner set of teeth 84 are exposed to the opposite polarity magnetic pole. In other respects, sensor 80 would operate in a manner like that of sensor 36.

In addition to a novel hub and bearing assembly and sensor design, this invention also encompasses a manner of indirectly measuring temperature of the hub and bearing assembly through a measurement of the temperature of coil winding 62. The ability to sense temperature can be critical in order to prevent heat related failures, such as that resulting from excessive or faulty braking from occurring. In accordance with this invention, temperature sensing is provided without adding any elements to the hub and bearing assembly 10. The feature is provided through the use of circuitry which provides an accurate measure of the resistance of coil winding 62. The DC resistance of an electrical conductor such as copper has a linear (or near linear) relationship to temperature such that the resistance of the element at any given temperature can be calculated using a simple formula.

This formula is simply the coefficient of temperature of the conductor multiplied by the resistance of the conductor at room temperature. This value is a change of resistance for each degree change in temperature. In order to obtain the resistance at a desired temperature, the delta resistance is multiplied by the total change in temperature and added to or subtracted from the conductor resistance at room temperature. With this ability to know what the resistance values are with respect to temperature of coil winding 62, a circuit can be utilized to process this into useable information.

In the typical implementation of a variable reluctance transducer including those previously described, one end of the coil winding is tied to electrical ground. In this configuration, wheel rotation produces an AC signal which is centered about ground (i.e. zero bias voltage). In order to exploit the combined temperature responsive characteristics of the winding along with rotation sensing, various approaches can be taken. One technique is illustrated by the circuit diagram of FIG. 7, designated by reference number 90. Circuit 90 is a simple voltage divider network. For this circuit a regulated voltage is provided using voltage regulator 92 connected to the vehicle battery power source 94. The regulated voltage output is applied to a pair of resistors in series, with resistor 96 acting as a reference resistor, whereas coil winding 62 defines a variable resistor whose resistance is related to temperature. The voltage at sensing node 98 provides a means of measuring the resistance of coil winding 62. If there is no relative rotation between the transducer stator and rotor, the voltage output measured at sensing node 98 will correspond with a particular resistance and hence temperature of coil winding 62. During rotation of tone ring 38 relative to transducer 40, an alternating AC signal will be observed at sensing node 98 with a DC bias which is proportional to resistance and, therefore, temperature of coil winding 62.

Figure 8:
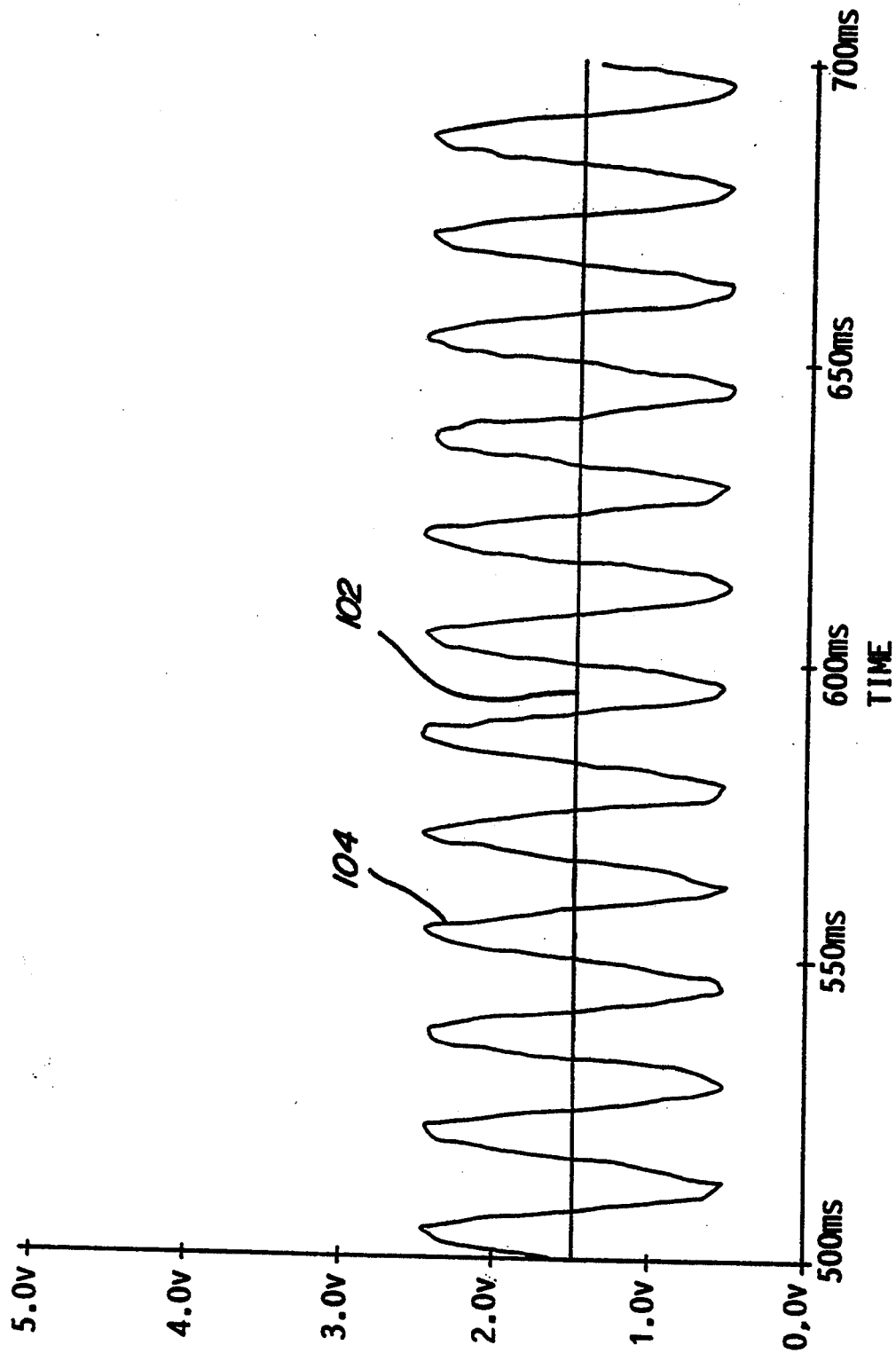
FIG. 8 is a signal diagram for the circuit of FIG. 7 showing an AC output component related to vehicle wheel speed and a DC offset or bias related to resistance of the transducer coil winding.

FIG. 8 provides a trace of a representative signal measured at node 98 in which the DC offset 102 provides the temperature measuring value whereas the frequency of the AC trace 104 is related to rotational speed. The particular value of DC bias 102 would be dependent upon the characteristics of the coil winding, including the length of conductor used, its gauge and material, along with the chosen value of the regulated voltage source and the relative resistance values of reference resistor 96 and coil winding 62.

The temperature measurement principles of this invention could be used with a broad array of materials defining coil winding 62 which exhibit a temperature resistance coefficient, whether it be a negative coefficient as in the case of metals or a positive coefficient as found in some semi-conductors. Naturally, a calibration table or curve would have to be created for the material and configuration selected for coil winding 62.

Another circuit for providing a resistance measurement for coil winding 62 is illustrated in FIG. 9 and is designated there by reference number 110. In this configuration, transistor 112 and resistor 114 provide a source of constant current through coil winding 62. In this case, the voltage at sensing node 116 also varies as the resistance of coil winding 62 changes in accordance with Ohm's law. As the resistance of coil winding 62 changes so does the voltage across the winding measured at node 116. As in the case of circuit 90, upon relative rotation between the tone ring 38 and transducer 40, an AC signal with a DC bias will be observed at sensing node 116.

Figure 10:
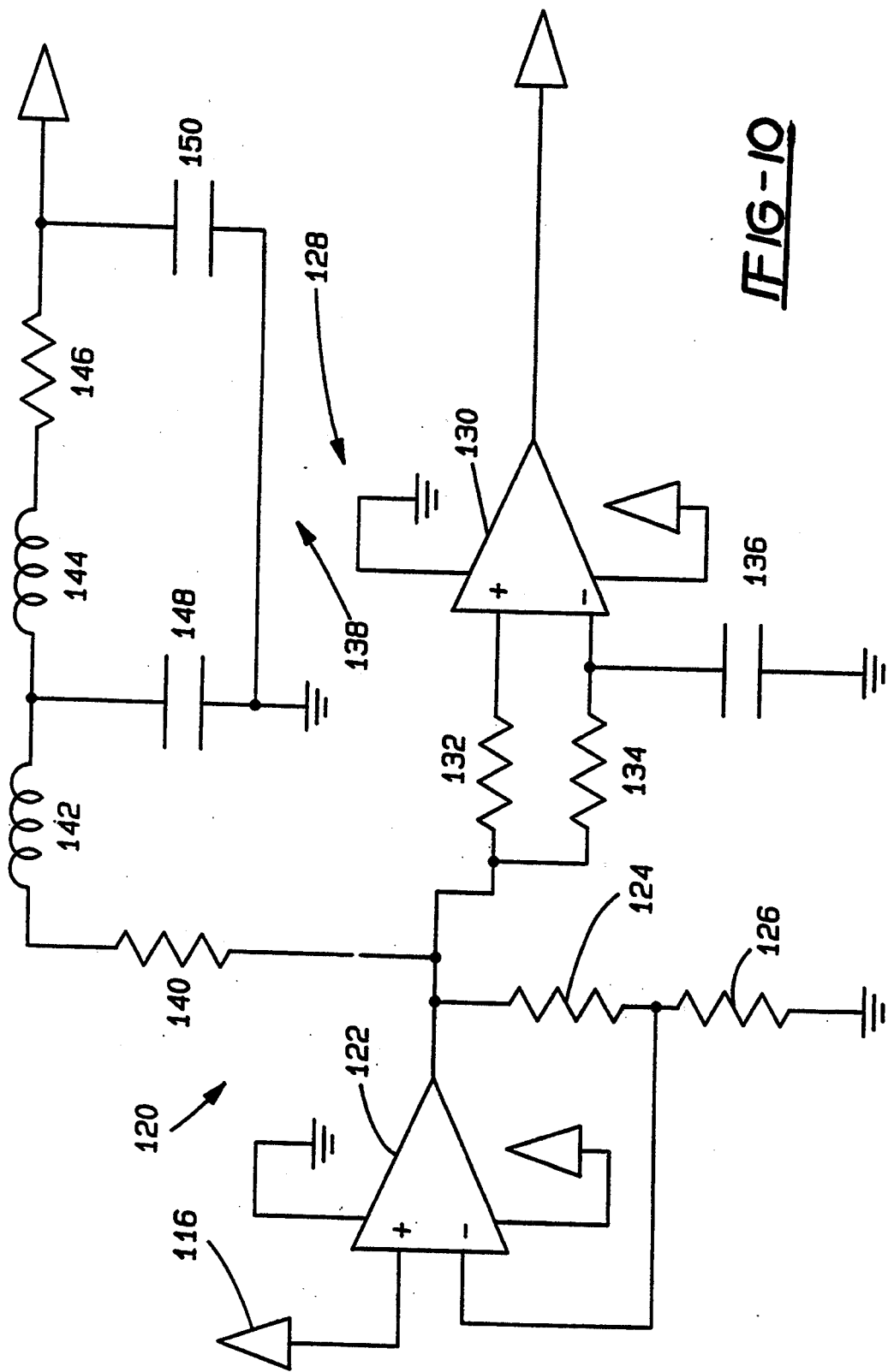
FIG. 10 is a simplified electrical circuit diagram for processing a voltage signal containing both AC and DC components to provide separate outputs related to relative rotation and winding resistance.

As is evident from a description of the circuits 90 and 110, the voltage at the sensing nodes is sensitive to loading. This results in the requirement that any outside circuit used to measure and evaluate the waveform must have a high impedance input. An example of one such a circuit is provided in FIG. 10 and is generally designated by reference number 120. Circuit 120 could be used with either of the prior approaches for providing a voltage output related to wheel rotation and resistance of the coil winding. In circuit 120, op-amp 122 is provided for input loading isolation. Op-amps available today are inherently high input impedance devices. Op-amp 122 includes a feedback loop including a voltage divider network including resistors 124 and 126 which provide a feedback voltage for gain control of op-amp 122. The output signal of op-amp 122 contains both an AC component related to wheel rotation and a DC offset or bias related to the resistance of coil winding 62.

Circuit 120 provides a pair of filter circuits designed to provide a square wave output having a frequency related to wheel speed, and a separate DC voltage for enabling temperature sensing. The network for providing a square wave output is designated by reference 128. Network 128 includes op-amp 130 with inputs of the op-amp passing through resistors 132 and 134. One of the inputs of op-amp 130 is, however, grounded through capacitor 136 which acts as an AC filter. By combining the inputs to op-amp 130 in this manner, a square wave output is provided at the output terminal of op-amp 130. The square wave output would be used by appropriate signal conditioning and controlling circuits as part of an ABS or traction control system.

Network 138 is provided as a DC pass filter in which an L-C tank circuit is fed through resistor 140 and inductor 142. The tank circuit also includes inductor 144 and resistor 146 with capacitors 148 and 150 tied to chassis ground. Circuit 138 effectively removes the AC component from the output signal and provides a steady DC voltage proportional to coil winding resistance, and consequently its temperature.

Figure 11:
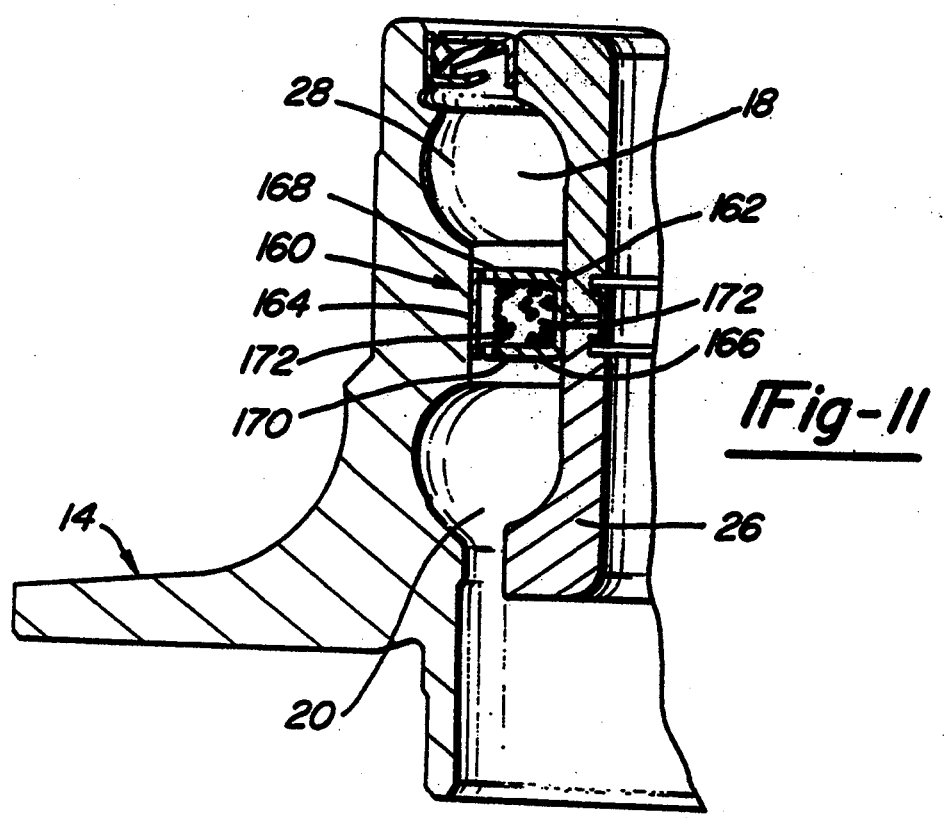
FIG. 11 is a partial cross-sectional view of a hub and bearing assembly according to a third embodiment of this invention featuring an annular sensor with radially outwardly facing teeth confronting a cylindrical tone ring.
Figure 12:
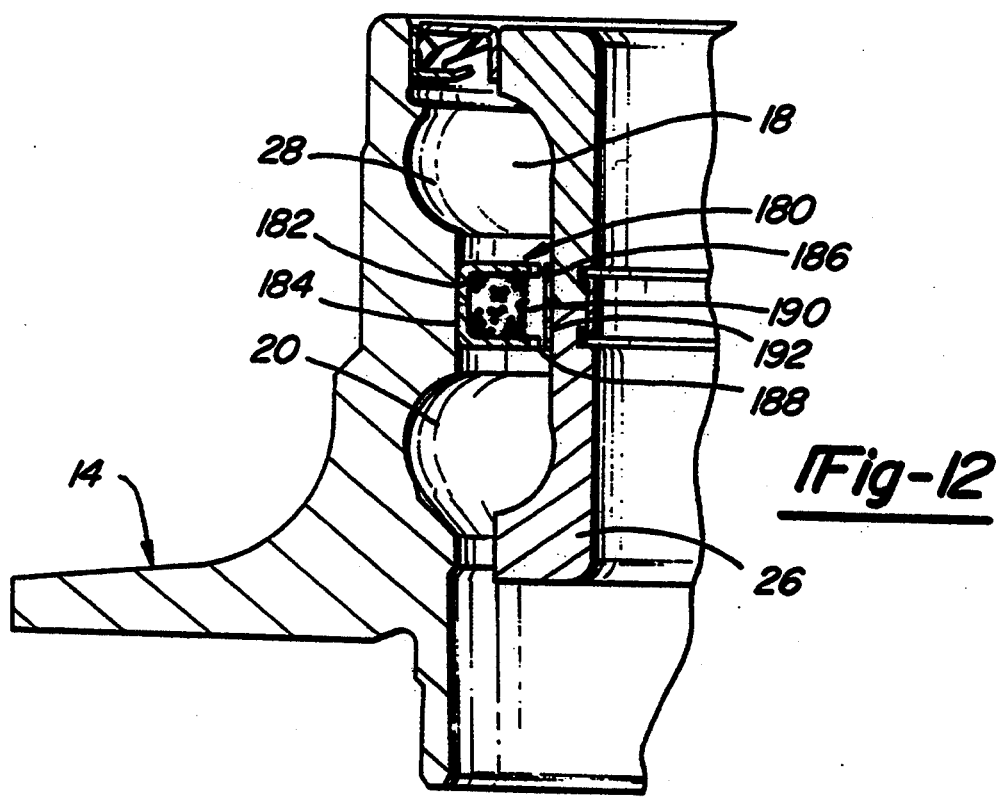
FIG. 12 is a partial cross-sectional view of a hub and bearing assembly according to a fourth embodiment of this invention featuring an annular sensor with radially inwardly facing teeth confronting a cylindrical tone ring.

FIGS. 11 and 12 provide illustrations of still additional embodiments of an annular sensor in accordance with the present invention. FIG. 11 provides a partial cross-sectional view showing sensor 160. Sensor 160 is shown installed within a hub and-bearing assembly like that illustrated in FIG. 2, and accordingly, common elements are identified by like reference numbers. As shown, sensor 160 incorporates annular transducer 162 and tone ring 164 which are positioned between inboard race 118 and outboard race 20 and between bearing inter race 26 and the bearing outer race as defined by hub 14. Sensor 160 varies from the previous embodiment in that transducer case 166 defines separated rows of teeth 168 and 170 which are oriented in a radially outward direction, with respect to the axis of rotation of the hub. This embodiment of annular transducer 160 is preferably implemented in a hub and bearing assembly in which hub 14 rotates with respect to inner race 26. As with the prior embodiments, transducer case 166 is formed having an open shell cross-sectional configuration, which encloses winding 172. For this embodiment, tone ring 164 is in the shape of a cylindrical hoop which, like the prior embodiments, features areas of magnetic polarity which alternate circumferentially around the ring. For this embodiment, teeth 168 and 170 would be staggered as in the first embodiment so that at any given time, one set of teeth face one magnetic pole, whereas the other set of teeth face the opposite magnetic pole. As previously described, relative rotation of the elements produces an alternating magnetic field through case 166, thus inducing an EMF in winding 172.

FIG. 12 illustrates a fourth embodiment of a sensor according to this invention identified by reference number 180. Sensor 180 is very similar to sensor 160 except that annular transducer 182 has a case 184 defining separated rows of teeth 186 and 188 which face in a radially inward direction. As in the prior embodiments, case 184 defines an open shell cross-sectional configuration which accommodates winding 190. For this embodiment, tone ring 192 would be essentially identical to tone ring 164 shown in FIG. 11, except that it would have a smaller diameter for fitting against bearing inner race 26.

The embodiments of this invention shown in FIGS. 11 and 12 possess certain attributes as compared with the other described embodiments. The positioning of the sensors 160 and 180 between ball elements 28 renders them essentially tamper proof. Moreover, these configurations are believed to enable an enhanced degree of control over the gap defined between the tone rings 164 and 192 and their respective annular transducers 162 and 182. Better control over this gap allows smaller gaps to be provided which generates higher outputs for the sensors without allowing the tone ring and annular transducer to physically contact one another.

While the above description constitutes the preferred embodiments of the present invention, it will be appreciated that the invention is susceptible to modification, variation and change without departing from the proper scope and fair meaning of the accompanying claims.

We claim:
1. A bearing assembly comprising:
an inner bearing race located radially within an outer bearing race, one of said inner or outer bearing races being fixed relative to said bearing assembly,
means for permitting relative rotation between said inner and outer bearing races, said means for permitting relative rotation located radially between said inner and outer races,
a source of magnetic field including a set of magnetic poles in mechanical communication with one of said inner or outer bearing races and a magnetically conductive element in mechanical communication with the other of said inner or outer bearing races, said set of magnetic poles and said magnetically conductive element rotating relative to each other and magnetically interacting and providing a source of magnetic flux of varying direction and magnitude through said magnetically conductive element;
an electrical conductor winding integrally connected to and about a circumference of said other bearing race; said electrical conductor winding magnetically communicating with said source of magnetic flux and conducting a magnetically induced voltage having an alternating component related to the speed of relative rotation between said inner race and said outer race, said voltage induced by said source of varying magnetic flux, and
temperature responsive means operatively connected to said electrical conductor winding for providing an output voltage signal related to the resistance of said electrical conductor winding where a direct current input signal having a predetermined amplitude is applied to said electrical conductor winding and said resistance varies in accordance with the temperature of said electrical conductor winding, said direct current input signal varying in accordance with said resistance to yield said output voltage, said output voltage being superimposed on said magnetically induced voltage.

2. A bearing assembly according to claim 1 wherein said temperature responsive means produces a variable voltage drop in response to a predetermined applied voltage across said conductor winding, said voltage drop varying in accordance with the resistance of said conductor winding.

3. A bearing assembly according to claim 2 wherein said temperature responsive means comprises resistance in series with said conductor winding thereby defining a voltage divider having a sensing node between said resistor and said conductor winding, said sensing node having a sensed voltage that varies in accordance with the temperature of said conductor windings.

4. A rotation sensor according to claim 2 wherein said temperature responsive means comprises a constant current source supplying current through said conductor winding and due to the current being constant, said voltage drop across said conductor winding is dependent on its resistance.

5. A bearing assembly according to claim 1 further comprising a signal processing circuit having:
an isolation element having an input sensing the output voltage signal provided by said conductor winding, said voltage signal comprising an AC component having a frequency related to the speed of relative rotation between said inner race and said outer race and a DC component related to the resistance of said conductor winding, an AC filter for removing said DC component thereby providing said AC component, and a DC filter for removing said AC component thereby providing said DC component.

6. A bearing assembly for a vehicle having a suspension component and a wheel comprising:

an inner bearing race fixed relative to either said vehicle suspension component or said wheel;

an outer bearing race which is rotatable with the other of said vehicle wheel or said vehicle suspension component;

means for permitting relative rotation between said inner and outer bearing races about a relative axis of rotation, said means for permitting relative rotation located radially between said inner and outer races;

a source of magnetic field including a set of magnetic poles in mechanical communication with outer bearing race and a magnetically conductive element in mechanical communication with said inner bearing race, said set of magnetic poles and said magnetically conductive element rotating relative to each other and magnetically interacting and providing a source of magnetic flux of varying direction and magnitude through said magnetically conductive element;

an electrical conductor winding integrally connected to and about a circumference of said fixed inner bearing race, said electrical conductor winding magnetically communicating with said source of induced varying magnetic flux and conducting a magnetically induced voltage having an alternating component related to the speed of relative rotation between said inner race and said outer race, said voltage induced by said source of varying magnetic flux; and temperature responsive means operatively connected to said electrical conductor winding for providing an output voltage signal related to the resistance of said electrical conductor winding where a direct current signal having a predetermined amplitude is applied to said electrical conductor winding and said resistance varies in accordance with the temperature of said electrical conductor winding, direct current input signal varying in accordance with said resistance to yield said output voltage, said output voltage being superimposed on said magnetically induced voltage.

7. A vehicle bearing assembly according to claim 6 wherein said temperature responsive means produces a variable voltage drop in response to a predetermined applied voltage across said conductor winding, said voltage drop varying in accordance with the resistance of said conductor winding.

8. A vehicle bearing assembly according to claim 7 wherein said temperature responsive means comprises a resistance in series with said conductor winding thereby defining a voltage divider having a sensing node between said resistor and said conductor winding, said sensing node having a sensed voltage that varies in accordance with the temperature of said conductor windings.

9. A vehicle bearing assembly according to claim 7 wherein said temperature responsive means comprises a constant current source supplying current through said conductor winding and due to the current being constant, said voltage drop across said conductor winding is dependent on its resistance.

10. A vehicle bearing assembly according to claim 6 further comprises a signal processing circuit having:

an isolation element having an input sensing the output voltage signal provided by said conductor winding, said voltage signal comprising an AC component having a frequency related to the speed of relative rotation between said inner race and said outer race and a DC component related to the resistance of said conductor winding, an AC filter for removing said DC component thereby providing said AC component, and a DC filter for removing said AC component thereby providing said DC component.

* * * * *

UNITED STATES PATENT AND TRADEMARK OFFICE
CERTIFICATE OF CORRECTION

PATENT NO. : 5,381,090
DATED : January 10, 1995
INVENTOR(S) : Jonathan M. Adler, et al.

It is certified that error appears in the above-indentified patent and that said Letters Patent is hereby corrected as shown below:

Column 8, Line 51, Claim 3 after "comprises" insert ---a---.

Column 9, Line 21, Claim 6 after "with" insert ---said---.

Signed and Sealed this

Twenty-eight Day of March, 1995

Attest:

BRUCE LEHMAN

Attesting Officer      Commissioner of Patents and Trademarks